United States Patent [19]
Hediger

[11] Patent Number: 4,965,638
[45] Date of Patent: Oct. 23, 1990

[54] DRIVE ARRANGEMENT FOR MOVING A DOCUMENT SCANNER

[75] Inventor: Edwin A. Hediger, Fairport, N.Y.

[73] Assignee: Eastman Kodak Company, Rochester, N.Y.

[21] Appl. No.: 415,938

[22] Filed: Oct. 2, 1989

[51] Int. Cl.$^5$ ............................................. G03G 15/04
[52] U.S. Cl. ..................................... 355/235; 358/497
[58] Field of Search ................................ 355/233–235; 358/497, 496

[56] References Cited

U.S. PATENT DOCUMENTS 4,710,017 12/1987 Watanabe et al. .................. 355/235
4,771,315 9/1988 Satomi .................................. 355/235

Primary Examiner—Joan H. Pendegrass
Attorney, Agent, or Firm—Leonard W. Treash

[57] ABSTRACT

Document scanner having a drive cable system constructed to provide desired alignment between the cables. The drive cables are wound around cylindrical drive members in a spiral fashion from two securing locations. One end segment of the cable spirals toward the center of the drive member in one direction and the other end segment of the cable spirals toward the center in the opposite direction. During the rotation of the drive member, the cable end segments add and subtract turns without changing the overall axial length or position of the cable winding or the alignment of the cable portions leaving the drive member.

16 Claims, 3 Drawing Sheets

DRIVE ARRANGEMENT FOR MOVING A DOCUMENT SCANNER

BACKGROUND OF THE INVENTION

1. Field of the Invention

This invention relates, in general, to photocopying and, more specifically, to drive systems for document scanning apparatus.

2. Description of the Prior Art

Document scanners are used for scanning or reading the image content of an original document. Sometimes, the scanner is used to optically expose lines of the document onto another surface. Electronic scanners, which have means for converting the light from the document into electrical signals, are becoming popular for use with electronic copiers and computers. Regardless of the use and the equipment to which it is connected, the scanner must contain accurate and reliable mechanical devices for moving the scanner across the document, or for moving the document across the scanner.

One type of scanner which is in wide use uses a moving carriage assembly which is positioned underneath the document and moves across the complete length of the document. The carriage assembly contains some or all of the optical and electronic or reflective components needed to move across the document during a scan. Drive mechanisms for such devices are varied, but one or more cables are frequently used to move the carriage. These cables are driven by pulleys, shafts, drums, etc., over which the cables are wound.

The arrangement of the cables around the pulleys and drive members usually requires certain restrictions on the size, placement, and complexity of the scanning apparatus. This frequently is necessitated by the fact that the required winding of the cables on the drive member cause the cables to enter and exit the drive member at different axial locations. This makes the cables not aligned with each other and any return pulley in the system needs to be oriented at an angle to accommodate the "tilted" cable orientation. This requirement adds to the complexity of the drive mechanism and to the overall size of the scanner.

U.S. Pat. No. 4,710,017, issued on Dec. 1, 1987, discloses a scanner suitable for use with a copy machine wherein the cable arrangement requires obliquely oriented pulleys in the system. While not identified with reference numbers, FIG. 10 of that patent shows the drive cables wound around cylindrical drive members with the two ends of the cable leaving the drive member at different axial positions. Thus, a nearby pulley, which is oriented obliquely to the drive member, is needed to move one end of the cable over in alignment with the other end of the cable leaving the drive member.

U.S. Pat. No. 4,771,315, issued on Sept. 13, 1988, discloses another arrangement known in the prior art which compensates for the offset of the cables. In FIG. 2 of that patent, the main drive pulley 14 is separated from the driving member or pulley 15. The cables around the pulley 15 appear to be in substantial alignment only because they do not wind around the pulley 15 for several turns, as they do around the drive pulley 14.

Therefore, it is desirable, and it is an object of this invention, to provide a scanner drive mechanism which eliminates the need to have obliquely aligned pulleys on the system, cables not aligned over one another, or extra drive components to compensate and correct for cable offset.

SUMMARY OF THE INVENTION

There is disclosed herein a new and useful document scanner drive mechanism which provides for accurate, compact, and simple movement of the carriage assembly of the scanner. According to the specific embodiment of the invention described herein, the document scanner includes first and second cylindrical drive members and first and second idler pulleys around which separate drive cables are positioned. Each drive cable is connected to an end portion of the carriage assembly which is guided along its path of travel by a suitable bar and guide block. Each of the drive cables are wound around separate drive members in a fashion which greatly reduces the axial spread between the two cable end segments where they enter and exit the drive member. Because of the alignment of the two end segments above each other, the idler pulley at the other end of each cable is permitted to be aligned with an axis of rotation which is parallel to the axis of rotation of the cylindrical drive members, thus reducing the complexity of and the space required for the document scanner.

According to the specific embodiment disclosed herein, each cable includes two end segments which spirally wind around a cylindrical drive member. One end segment is secured to the drive member and spirally wound around the drive member toward the center, or adjacent area, of the drive member. The other end segment is secured to the drive member at the other end and spirals around the drive member in the opposite direction to the area adjacent to the other end segment. Both end segments extend from this area to the idler pulley associated with this cable.

When the drive member rotates in one direction, additional turns are added to one of the end segments and turns are removed from the other end segment. When the drive member rotates in the other direction, turns are added to and removed from opposite end segment spirals. The net result is that the region or area where the two end segments leave the cylindrical member and extend toward the idler pulley moves across the cylindrical member between two securing locations. When the carriage assembly is at one end of its movement travel, the adjacent area of the cable end segments is at one securing location and, when the carriage assembly is at the other end, the adjacent area of the cable end segments is at the other securing location. However, during its travel from one location to the other, the adjacent area where the cable end segments extend from the drive member always has the cables in close axial alignment with each other, thereby permitting the desired orientation of the idler pulley.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
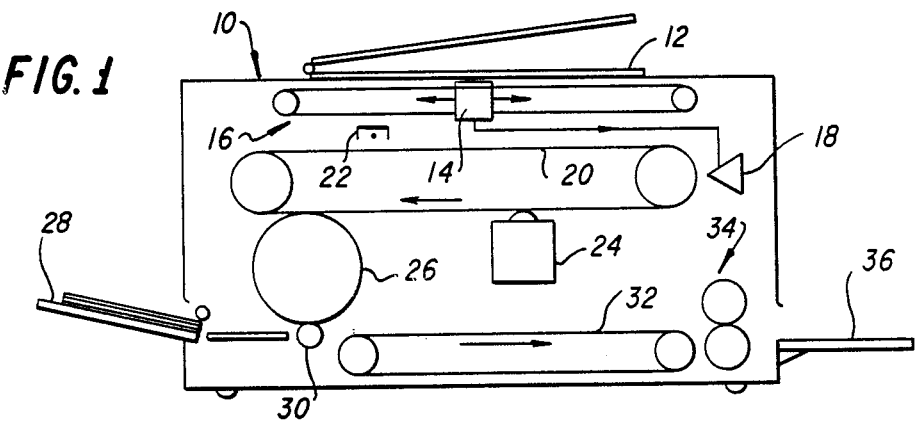
FIG. 1 is a schematic view of a copier wherein the invention may be used.

Throughout the following description, similar reference characters refer to similar elements or members in all of the figures of the drawings.

Referring now to the drawings, and to FIG. 1 in particular, there is shown a particular form of a copier 10 in which the invention may be used. Various forms of copiers, and other equipment not directly associated with electrophotographic copiers, can also use the scanner constructed according to this invention.

According to FIG. 1, the copier 10 includes the platen 12 on which the original document (not shown) is placed. The scanning head or carriage assembly 14 is moved back and forth, in the directions indicated, underneath the platen 12 by the pulley and cable assembly 16 which will be described in more detail later. Data obtained during scanning is sent to the LED printhead 18, although an electronic buffer or memory device may be used to temporarily store the scanned data before it is transferred to the printhead 18. The printhead 18 selectively exposes the photosensitive member 20 which rotates past the printhead 18 after being charged by the primary charger 22. The latent image formed on the photosensitive member 20 is developed by the toner station 24 and then transferred to the intermediate transfer drum or roller 26. At the appropriate time, a sheet of paper from the tray 28 is fed into the contact area between the drum 26 and the transfer roller 30 to receive the developed image on the paper. The sheet of paper is then moved by the conveyor 32 to the fuser station 34 and sent to the output tray 36.

Other forms of apparatus may use the teachings of this invention. Instead of moving the carriage assembly 14 underneath the platen 12 as shown in FIG. 1, the document scanner may actually keep the carriage assembly stationary and move the platen 12 across the scanner optics, thereby providing relative movement between the original document and the scanning elements. In any event, the invention herein is applicable to any scanning drive mechanism wherein an accurate, compact, and simple drive mechanism is useful. The invention herein is also useful in optical copiers wherein the scanning forms an optical image on the photosensitive member of the copier.

Figure 2:
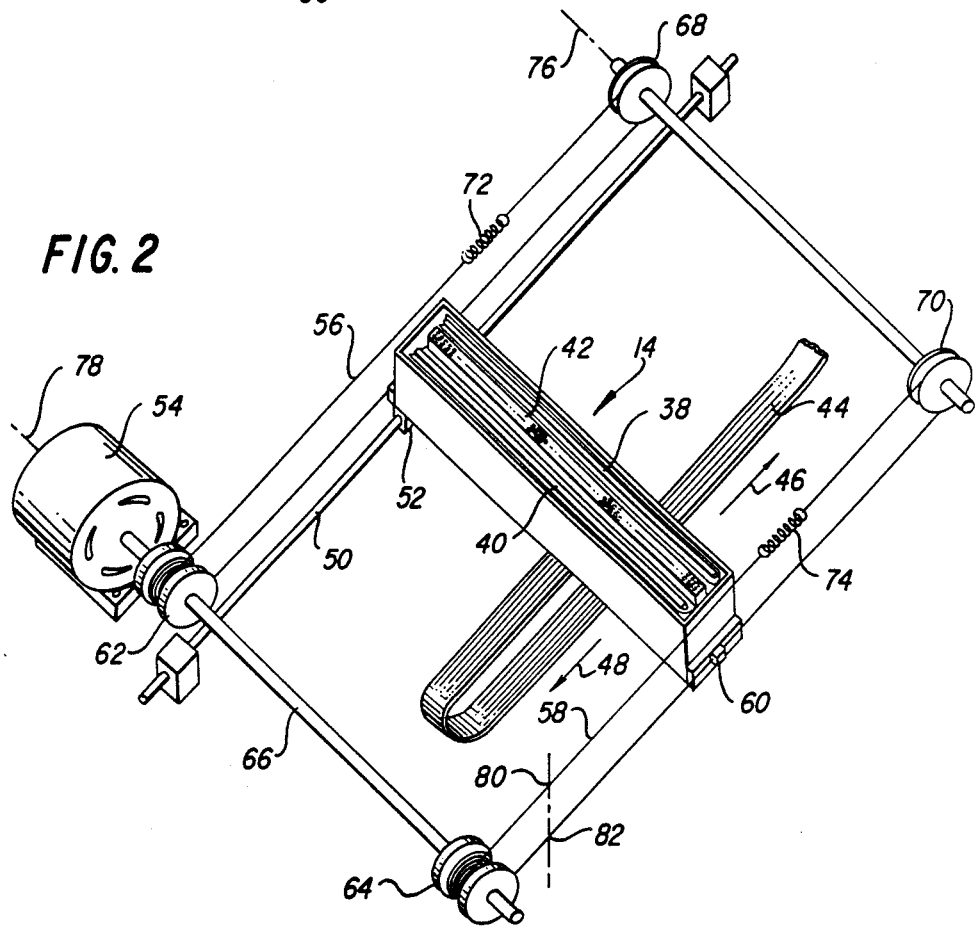
FIG. 2 is an isometric view of a document scanner constructed according to this invention.

FIG. 2 illustrates a particular construction of a document scanner according to one specific embodiment of this invention. According to FIG. 2, the carriage assembly 14 includes the reflector-backed light sources 38 and 40 which are located on both sides of a fiber optic lens assembly 42. Light from the sources 38 and 40 projects through the platen, underneath which the scanner is located, and reflected light from the original document is transmitted through the fiber optic lens assembly 42 to a suitable sensing device, such as a CCD sensor array, or directly to a photosensitive member. Electrical cable 44 is used to connect the carriage assembly 14 to the other electrical components of the scanning or copying system.

In order to accomplish its purpose of moving along the complete length of the original document, the carriage assembly 14 is capable of being moved in both directions, as indicated by arrows 46 and 48 in FIG. 2. Movement in these directions is guided or maintained by the stationary track or bar 50 which extends through the guide block 52 attached to the carriage assembly 14. The motor 54 is appropriately controlled to move the flexible cables 56 and 58 which are attached to the ends of the carriage assembly, such as at position 60.

Cables 56 and 58, according to this invention, provide the main drive force to the carriage assembly 14. These cables extend around the drive members 62 and 64 which are pulleys or cylindrical drums which are attached to each other and rotated simultaneously by the shaft 66. Idler pulleys 68 and 70 are used at the other ends of the cables 56 and 58, respectively, as shown in FIG. 2. Springs 72 and 74 are used in the drive cables to eliminate slack in the cable and to compensate for any difference in length between the two cables. In order to reduce the effect of the springs 72 and 74 during a scanning operation, the scanner is moved in the direction indicated by arrow 48 for the actual scanning operation, thereby eliminating the springs from the cable segment pulling the carriage 14 toward the drive members 62 and 64. The springs 72 and 74 are in the drive circuit when the carriage is being returned to its originating position. However, the small deviations in the lengths of the cables provided by the springs can be tolerated on the return movement of the carriage assembly 14.

As can be seen in FIG. 2, the drive members 62 and 64 rotate around the axis 78. Idler pulleys 68 and 70 rotate around the axis 76. Because, according to this invention, axes 76 and 78 are parallel to each other, the complexity and size of the document scanner shown in FIG. 2 is more desirable than document scanners not so constructed. This type of alignment is provided by the fact that the upper and lower portions of the cable are aligned vertically over each other because of the way they enter and leave on the top and bottom of the drive members 62 and 64. In other words, point 80 on cable 58 is located directly above point 82 of the cable 58, with both points being substantially at the same position along the axis 78.

Figure 3:
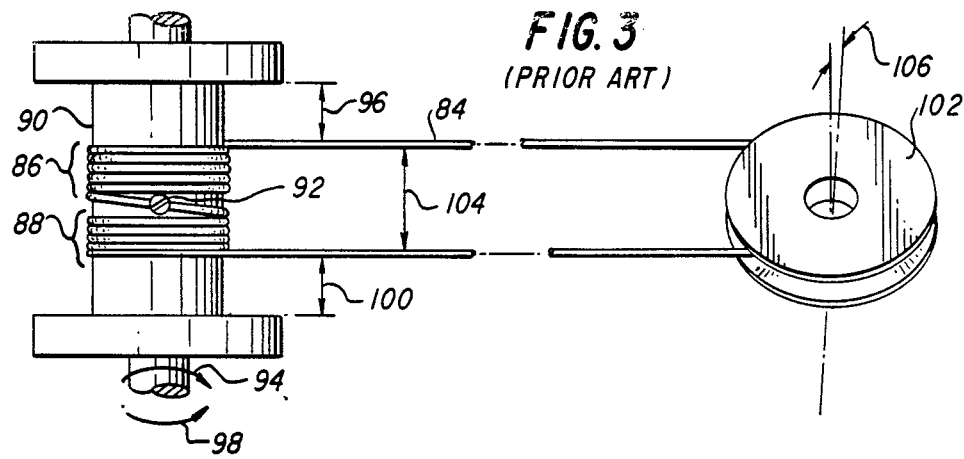
FIG. 3 is a view of a drive cable assembly as used in the prior art.

It is the manner in which the cables are wrapped around the drive members which determines the spacing between the two cable segments leaving the drive member. FIG. 3 illustrates a conventional cable anchoring system used in the prior art which requires that the idler pulley be oriented obliquely to the axis of the drive member. According to FIG. 3, the cable 84 includes end segments 86 and 88 which are wound around the drive member 90 in the manner indicated. These two end segments are anchored or secured to the drive member 90 by the screw 92. Although additional turns may be used in an actual scanner drive mechanism, the cable position shown in FIG. 3 would exist when the carriage assembly is substantially in the middle of travel between the two extreme end positions.

When the drive member 90 rotates in direction 94, end segment 88 will unwind and end segment 86 will wind around the drive member 90 for additional turns. At the extreme end of carriage movement, the last turn of the end segment 86 moves or "walks" up the drive member 90. This requires the extra distance 96 on the drive member 90 to accommodate the additional turns on the end segment 86. When the drive member 90 rotates in the other direction 98, turns are removed from the end segment 86 and turns are added or wound to the end segment 88. This moves the last turn of the end segment 88 down near the bottom of the drive member 90, thus requiring the extra distance 100.

It is emphasized here that the extra distances 96 and 100, which are needed according to the prior art, are not needed according to the present invention. This alone offers complexity and space savings of the invention over the prior art. In addition, the idler pulley 102, according to the prior art, must be obliquely aligned with the axis of the drive member 90 because of the axial offset distance 104 between where the two end segments enter and leave the drive member 90. Angle 106 represents the angle by which the idler pulley must be oriented apart from the axis of rotation of the drive member 90. Since the pulley 102 is aligned obliquely to the drive member 90, the effective diameter of the pulley 102 must be larger than the effective diameter of the drive member 90 to keep the extended cable strands parallel to each other.

Figure 4:
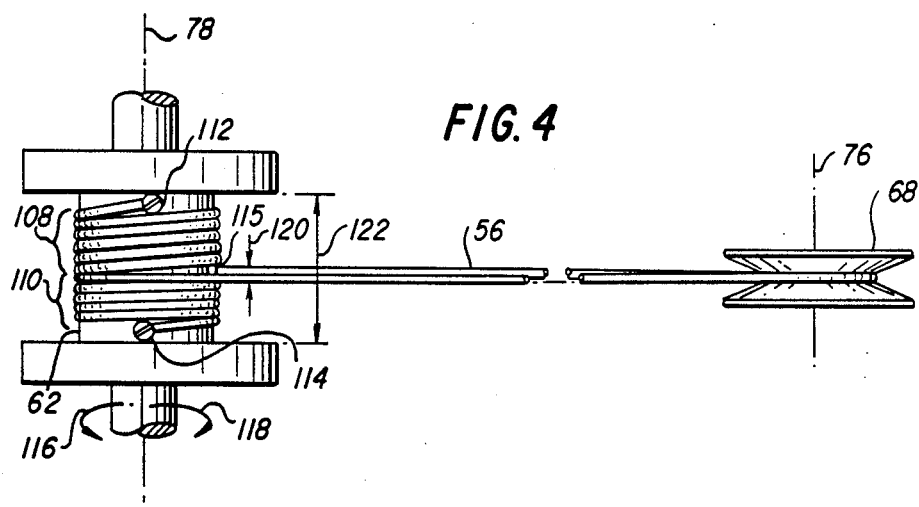
FIG. 4 is a view of a drive cable assembly used in the scanner of FIG. 2.

FIG. 4 illustrates how the present invention winds the cable end segments around the drive member. With this arrangement, the axis 78 of the drive member 62 is parallel to the axis 76 of the idler pulley 68, which is also shown in FIG. 2 for cable 56. End segments 108 and 110 of the cable 56 are attached to the drive member 62 by the screws 112 and 114, respectively. Other forms of attachment may be used within the contemplation of the invention. Beginning at screw 112, end segment 108 spirals in circular direction 116 around the drive member 62 and progresses axially to the center area of the drive member where it leaves the drive member at position 115 and extends to the idler pulley 68. Cable end segment 110 is spirally wound around the drive member 62 from the screw 114 in the circular direction 118. Again, this end segment leaves the drive member 62 near the center of the drive member 62 and extends to the idler pulley 68 which is of the same effective diameter as member 62. Since the cable end segments extend from the drive member 62 at locations only one-half turn around the surface of the drive member, there is only one-half the diameter of the cable 56 separating the two cable end segments along the axis 78. In other words, the total width or dimension along the axis 78 of both cables is only one and one-half cable diameters, as shown by dimension 120.

During operation, the drive member 62 rotates in directions 116 and 118 to move the cable 56 in the appropriate directions. When the drive member rotates in direction 116, additional turns are added to end segment 110, and at the same time, turns are removed from the end segment 108. However, as should be evident, the dimension 120 does not change during such rotation. Thus, the alignment of the idler pulley 68 does not change when the drive member 62 rotates. When the drive member 62 rotates in direction 118, turns are removed from end segment 110 and added to end segment 108. In either case, the complete progression of the cable entering and leaving locations from the drive member 62 is contained within the dimension 122, which is significantly less than the overall dimensions required for the drive member 90 shown in FIG. 3 according to the prior art. Although the end segments 108 and 110 are defined as being wound in opposite directions 116 and 118 from their securing locations, it is noted that the turns spiral in the same direction when viewed as extending in the same axial direction.

Figure 5:
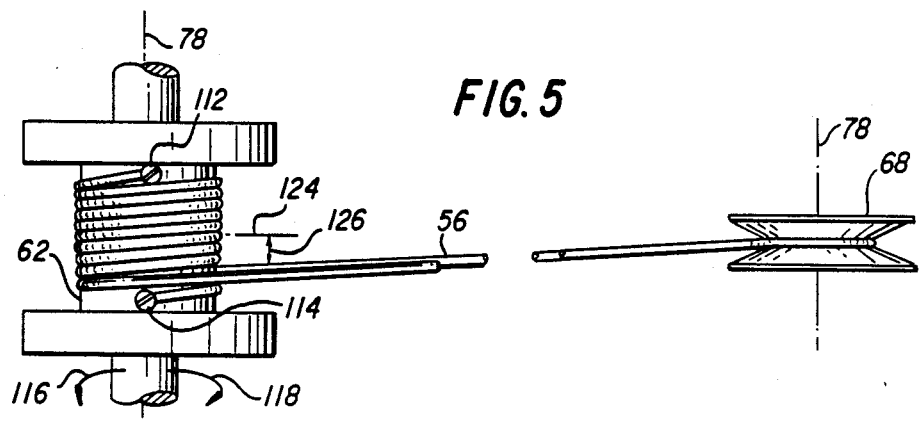
FIG. 5 is a view of the drive cable assembly of FIG. 4 shown at a different position.

FIG. 5 illustrates the drive cable position of the system shown in FIG. 4 when the drive member 62 has rotated for substantially the maximum amount in direction 118. As is contrary to the prior art arrangement, the arrangement of this invention does not require any additional turns above or below the turns on the drive member when the cable is in the center position. Basically, it is the position, or adjacent area, where the cable end segments enter and leave the drive member which moves axially up and down the drive member. This movement stays within the confines of the two extremes or end points of the end segments where they are secured to the drive member by screws 112 and 114. In FIG. 5, the adjacent area of the cable end segments moved from the center position 124, which was shown in FIG. 4, to the extreme bottom position shown in FIG. 5 for a distance of 126. Conversely, if the drive member 62 had rotated in direction 116 to the maximum amount, the adjacent area of the cable end segments would be at the extreme upward position by an equal amount.

Figure 6:
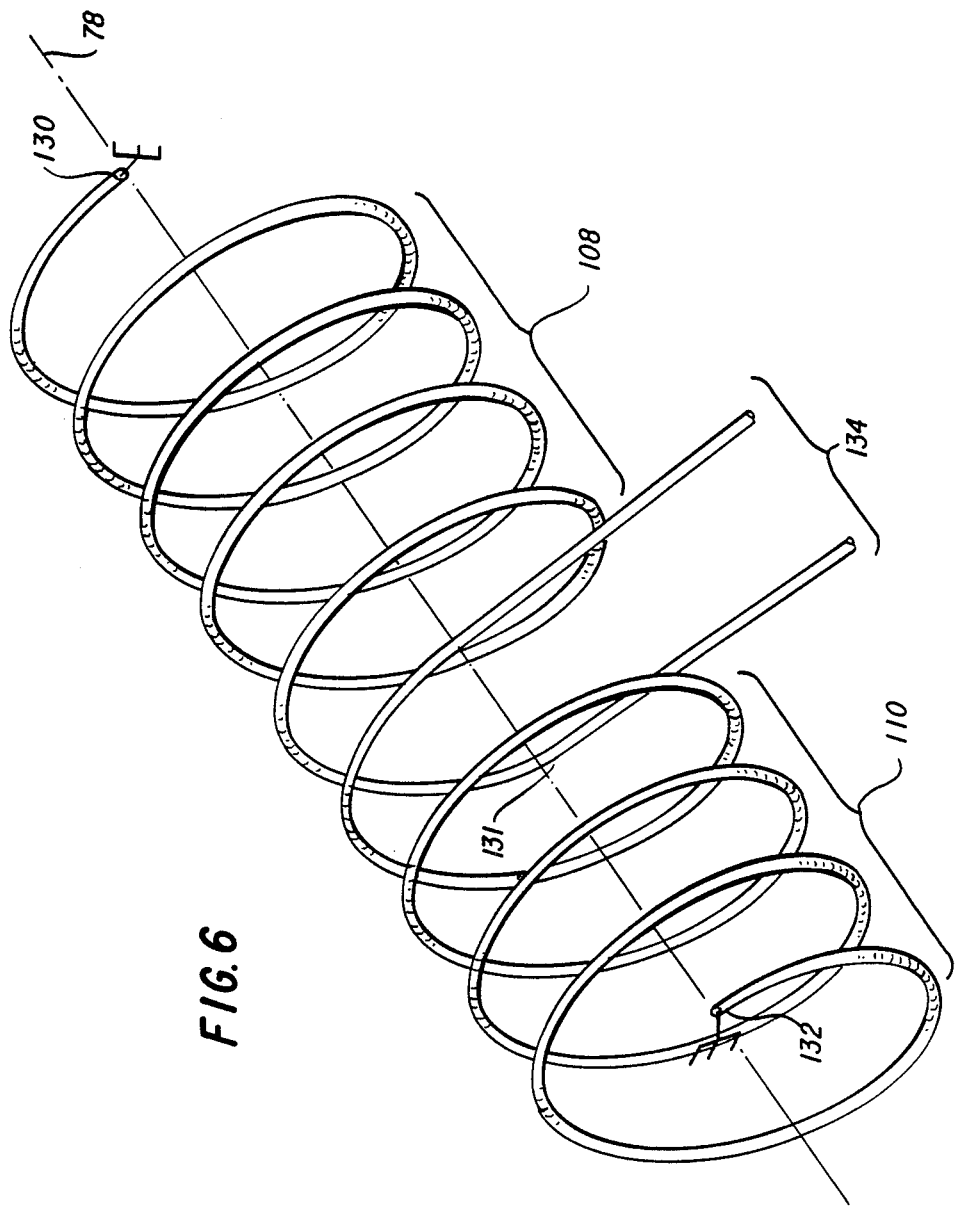
FIG. 6 is an exploded view illustrating the cable winding arrangement taught by this invention.

FIG. 6 shows an exploded view of the cable end segments and how they are spirally wound around the drive member according to this invention. Cable end segment 108 is spirally wound around the axis 78. From the securing position 130, the spiral progresses to the center area 131 of the overall cable winding system and drive member. On the other hand, cable end segment 110 extends from the securing point 132 in a spiral fashion, with the spiral progressing toward the center section or center area 131 of the overall winding around the cylindrical drive member. Of course, the cable portions 134 shown in FIG. 6 entering and leaving at the center area 131 would only be positioned in the center area 131 when the drive member is at the proper rotation for the carriage assembly of the scanner to be located approximately half-way between the two extremes of its travel. The location of the adjacent area where the cable end portions of segments are adjacent to each other moves up or down the winding assembly when the carriage assembly is at the extremes of its movement locations.

There has been shown herein a new and useful arrangement for driving the moving portion of a document scanner. The arrangement allows for a more accurate, compact, and simple construction than that provided by the prior art. It is emphasized that numerous changes may be made in the above-described apparatus without departing from the teachings of the invention. It is intended that all of the matter contained in the foregoing description, or shown in the accompanying drawings, shall be interpreted as illustrative rather than limiting.

I claim as my invention:

1. A document scanner suitable for scanning the image content of an original document, said scanner comprising:

a movable device;

means for guiding the direction of movement of said device;

at least one rotatable drive member;

a cable attached to said movable device and wound around said drive member and;

means for securing the cable to two separate locations on said drive member;

said cable including first and second end segments which are spirally wound around said drive member, with the first end segment spiral progressing in one axial direction from one of the securing locations to an adjacent area of the drive member and the second end segment spiral progressing in the opposite axial direction from the other securing location to said adjacent area.

2. The document scanner of claim 1 including an idler pulley around which the cable is positioned, with the movable device being attached to the cable at a location which is between the drive member and the idler pulley.

3. The document scanner of claim 1 wherein the drive member has a cylindrical surface over which the cable end segments are wound.

4. The document scanner of claim 3 wherein the two cable end segments first begin to wrap around the drive member at substantially opposite radial points around the cylindrical surface.

5. The document scanner of claim 1 wherein the two cable end segment spirals are wound in opposite circular directions around the drive member such that one spiral unwinds and the other spiral winds when the drive member rotates in the same direction.

6. The document scanner of claim 1 wherein the two cable end segments first begin to wrap around the drive member substantially at said adjacent area.

7. The document scanner of claim 2 wherein the idler pulley and the drive member are rotatable around axes which are parallel to each other.

8. A document scanner suitable for scanning the image content of an original document, said scanner comprising:
   a movable carriage assembly containing optics used in directing images obtained from the original document;
   means for guiding the direction of movement of said carriage assembly;
   at least one cylindrical drive member;
   an idler pulley located remote from said drive member;
   a flexible cable, said cable extending around said drive member and said idler pulley, said cable being attached to said carriage assembly at a location which is between the drive member and the idler pulley, and said cable including first and second end segments which are spirally wound around said drive member; and
   means for securing the cable end segments to two separate locations on said drive member, said locations being separated from each other by a plurality of turns of both cable end segments;
   with the two cable end segment spirals each beginning at the separate securing locations and rotating in opposite directions around the drive member such that one spiral unwinds and the other spiral winds when the drive member rotates in the same direction.

9. The document scanner of claim 8 wherein the axis of rotation of the idler pulley and the axis of rotation of the cylindrical drive member are parallel to each other.

10. The document scanner of claim 8 wherein the first end segment spiral progresses in one direction from one of the securing locations to an adjacent area of the drive member and the second end segment spiral progresses in the opposite direction from the other securing location to said adjacent area, said directions being along the axis of rotation of the drive means.

11. The document scanner of claim 8 wherein the two cable end segments first begin to wrap around the drive member at substantially opposite points around the cylindrical surface.

12. The document scanner of claim 8 wherein the points at which the cable end segments first begin to wrap around the drive member are separated along the axis of rotation of the cylindrical drive member by substantially one-half the diameter of the cable.

13. The document scanner of claim 8 wherein the two cable end segments first begin to wrap around the drive member at a location along the axis of rotation of the drive member which is substantially midway between the two securing locations when the carriage assembly is substantially at the midpoint of its allowable movement.

14. A document scanner suitable for scanning the image content of an original document, said scanner comprising:
   a movable carriage assembly containing optics used in directing images obtained from the original document to a light sensing device;
   means for guiding the direction of movement of said carriage assembly in a straight line;
   first and second cylindrical drive members connected together to rotate around their axes at the same rate;
   means for rotating said cylindrical drive members;
   first and second idler pulleys located remote from said drive members with the axes of rotation of the pulleys being parallel to the axes of rotation of said drive members;
   a first flexible drive cable extending around said first drive member and said first pulley;
   a second flexible drive cable extending around said second drive member and said second pulley;
   said cables being attached to opposite ends of said carriage assembly, with said carriage assembly being located between the drive members and the idler pulleys, and said cables each including first and second end segments which are spirally wound around their respective drive member;
   means for maintaining a predetermined amount of tightness in each cable; and
   means for securing the cable end segments to two separate locations on the respective drive member, said locations being separated from each other by a plurality of turns of both cable end segments;
   with the two cable end segment spirals beginning at the separate securing locations and rotating in opposite directions around the respective drive member in such a manner that one spiral on each drive member unwinds and the other spirals wind when the drive members are being rotated in the same direction.

15. The document scanner of claim 14 wherein, for each cable, the first end segment spiral progresses in one direction from one of the securing locations to an adjacent area of the drive member and the second end segment spiral progresses in the opposite direction from the other securing location to said adjacent area, said directions being along the axis of rotation of the drive member.

16. The document scanner of claim 14 wherein, for each cable, the two end segments first begin to wrap around the drive member at substantially opposite radial points around the cylindrical surface, and the points at which the cable end segments first begin to wrap around the drive member are separated along the axis of rotation of the cylindrical drive member by substantially one-half the diameter of the cable.

* * * * *